(12) United States Patent
Bilbrey et al.

(10) Patent No.: US 12,494,026 B1
(45) Date of Patent: Dec. 9, 2025

(54) SYNCHRONIZED, INTERACTIVE AUGMENTED REALITY DISPLAYS FOR MULTIFUNCTION DEVICES

(71) Applicant: Apple Inc., Cupertino, CA (US)

(72) Inventors: Brett C. Bilbrey, Sunnyvale, CA (US); Nicholas V. King, San Jose, CA (US); Aleksandar Pance, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/348,966

(22) Filed: Jul. 7, 2023

Related U.S. Application Data

(63) Continuation of application No. 17/104,305, filed on Nov. 25, 2020, now Pat. No. 11,721,073, which is a
(Continued)

(51) Int. Cl.
*G06T 19/00* (2011.01)
*G06F 1/16* (2006.01)
(Continued)

(52) U.S. Cl.
CPC .......... *G06T 19/006* (2013.01); *G06F 1/1694* (2013.01); *G06F 3/011* (2013.01); *G06F 3/0488* (2013.01); *G06T 19/20* (2013.01); *G09G 5/377* (2013.01); *H04N 1/00323* (2013.01); *H04N 5/222* (2013.01); *H04N 5/272* (2013.01); *H04N 21/2187* (2013.01); *H04N 21/42202* (2013.01); *H04N 21/4312* (2013.01); *H04N 21/4314* (2013.01); *H04N 21/472* (2013.01);
(Continued)

(58) Field of Classification Search
None
See application file for complete search history.

(56) References Cited

U.S. PATENT DOCUMENTS

| 5,625,765 A | 4/1997 | Ellenby et al. |
| 5,682,332 A | 10/1997 | Ellenby et al. |

(Continued)

FOREIGN PATENT DOCUMENTS

| WO | 2005062590 | 7/2005 |
| WO | 2007101703 | 9/2007 |

OTHER PUBLICATIONS

U.S. Appl. No. 12/652,725, Response filed Oct. 29, 2012 to Final Office Action mailed Jun. 28, 2012, 9 pgs.
(Continued)

*Primary Examiner* — James M Hannett
(74) *Attorney, Agent, or Firm* — Robert C. Kowert; Kowert, Hood, Munyon, Rankin & Goetzel, P.C.

(57) ABSTRACT

A device can receive live video of a real-world, physical environment on a touch sensitive surface. One or more objects can be identified in the live video. An information layer can be generated related to the objects. In some implementations, the information layer can include annotations made by a user through the touch sensitive surface. The information layer and live video can be combined in a display of the device. Data can be received from one or more onboard sensors indicating that the device is in motion. The sensor data can be used to synchronize the live video and the information layer as the perspective of video camera view changes due to the motion. The live video and information layer can be shared with other devices over a communication link.

20 Claims, 9 Drawing Sheets

Related U.S. Application Data continuation of application No. 16/240,655, filed on Jan. 4, 2019, now Pat. No. 10,854,008, which is a continuation of application No. 15/081,145, filed on Mar. 25, 2016, now Pat. No. 10,176,637, which is a continuation of application No. 14/146,419, filed on Jan. 2, 2014, now Pat. No. 9,305,402, which is a continuation of application No. 13/768,072, filed on Feb. 15, 2013, now Pat. No. 8,625,018, which is a continuation of application No. 12/652,725, filed on Jan. 5, 2010, now Pat. No. 8,400,548.

(51) Int. Cl.

| | |
|---|---|
| G06F 3/01 | (2006.01) |
| G06F 3/0488 | (2022.01) |
| G06T 19/20 | (2011.01) |
| G09G 5/377 | (2006.01) |
| H04N 1/00 | (2006.01) |
| H04N 5/222 | (2006.01) |
| H04N 5/272 | (2006.01) |
| H04N 21/2187 | (2011.01) |
| H04N 21/422 | (2011.01) |
| H04N 21/431 | (2011.01) |
| H04N 21/472 | (2011.01) |
| H04N 21/4788 | (2011.01) |
| H04N 21/81 | (2011.01) |
| H04N 23/63 | (2023.01) |
| H04N 23/661 | (2023.01) |

(52) U.S. Cl.
CPC ..... *H04N 21/4788* (2013.01); *H04N 21/8133* (2013.01); *H04N 23/632* (2023.01); *H04N 23/661* (2023.01); *G06F 2203/04803* (2013.01); *G06T 2219/004* (2013.01); *G09G 2340/12* (2013.01); *G09G 2340/125* (2013.01); *G09G 2340/14* (2013.01); *G09G 2354/00* (2013.01)

(56) References Cited

U.S. PATENT DOCUMENTS

| | | | |
|---|---|---|---|
| 5,742,521 A | 4/1998 | Ellenby et al. | |
| 5,815,411 A | 9/1998 | Ellenby et al. | |
| 6,020,931 A | 2/2000 | Bilbrey et al. | |
| 6,031,545 A | 2/2000 | Ellenby et al. | |
| 6,037,936 A | 3/2000 | Ellenby et al. | |
| 6,064,398 A | 5/2000 | Ellenby et al. | |
| 6,173,239 B1 | 1/2001 | Ellenby | |
| 6,278,461 B1 | 8/2001 | Ellenby et al. | |
| 6,307,556 B1 | 10/2001 | Ellenby et al. | |
| 6,396,475 B1 | 5/2002 | Ellenby et al. | |
| 6,414,696 B1 | 7/2002 | Ellenby et al. | |
| 6,522,292 B1 | 2/2003 | Ellenby et al. | |
| 6,535,210 B1 | 3/2003 | Ellenby et al. | |
| 6,690,370 B2 | 2/2004 | Ellenby et al. | |
| 7,007,236 B2 | 2/2006 | Dempski et al. | |
| 7,031,875 B2 | 4/2006 | Ellenby et al. | |
| 7,185,054 B1 * | 2/2007 | Ludwig | H04L 65/1101 348/E7.083 |
| 7,301,536 B2 | 11/2007 | Ellenby et al. | |
| 7,720,436 B2 | 5/2010 | Hamynen et al. | |
| 7,817,104 B2 | 10/2010 | Ryu et al. | |
| 7,916,138 B2 | 3/2011 | John et al. | |
| 8,301,159 B2 | 10/2012 | Hamynen et al. | |
| 8,400,548 B2 | 3/2013 | Bilbrey et al. | |
| 8,625,018 B2 | 1/2014 | Bilbrey et al. | |
| 9,305,402 B2 | 4/2016 | Bilbrey et al. | |
| 10,176,637 B2 | 1/2019 | Bilbrey et al. | |
| 10,854,008 B2 | 12/2020 | Bilbrey et al. | |
| 2003/0128162 A1 | 7/2003 | Ellenby et al. | |
| 2003/0184594 A1 | 10/2003 | Ellenby et al. | |
| 2003/0209893 A1 | 11/2003 | Breed et al. | |
| 2004/0095345 A1 | 5/2004 | Ellenby et al. | |
| 2004/0189675 A1 | 9/2004 | Pretlove et al. | |
| 2004/0219961 A1 | 11/2004 | Ellenby et al. | |
| 2006/0161379 A1 | 7/2006 | Ellenby et al. | |
| 2006/0190812 A1 | 8/2006 | Ellenby et al. | |
| 2006/0241792 A1 | 10/2006 | Pretlove et al. | |
| 2007/0162942 A1 | 7/2007 | Hamynen et al. | |
| 2008/0118162 A1 * | 5/2008 | Siegemund | G06V 30/162 382/229 |
| 2008/0123910 A1 | 5/2008 | Zhu | |
| 2009/0102859 A1 | 4/2009 | Athsani et al. | |
| 2009/0189974 A1 | 7/2009 | Deering | |
| 2009/0232354 A1 | 9/2009 | Camp, Jr. et al. | |
| 2010/0030578 A1 | 2/2010 | Siddique et al. | |
| 2010/0160014 A1 | 6/2010 | Galasso et al. | |
| 2010/0257252 A1 | 10/2010 | Dougherty et al. | |
| 2010/0302141 A1 | 12/2010 | Shankar et al. | |
| 2010/0328344 A1 | 12/2010 | Mattila et al. | |
| 2011/0050909 A1 | 3/2011 | Ellenby et al. | |
| 2011/0098029 A1 | 4/2011 | Rhoads et al. | |
| 2011/0143811 A1 | 6/2011 | Rodriguez | |
| 2011/0161076 A1 | 6/2011 | Davis et al. | |
| 2011/0161875 A1 | 6/2011 | Kankainen | |
| 2011/0164163 A1 | 7/2011 | Bilbrey et al. | |
| 2013/0155307 A1 | 6/2013 | Bilbrey et al. | |

OTHER PUBLICATIONS

U.S. Appl. No. 12/652,725, Examiner Interview Summary mailed Apr. 30, 2012, 3 pgs.
U.S. Appl. No. 12/652,725, Final Office Action mailed Jun. 28, 2012, 10 pgs.
U.S. Appl. No. 12/652,725, Non Final Office Action mailed Feb. 9, 2012, 9 pgs.
U.S. Appl. No. 12/652,725, Notice of Allowance mailed Nov. 14, 2012, 8 pgs.
U.S. Appl. No. 12/652,725, Response filed May 15, 2012 to Non Final Office Action mailed Feb. 9, 2012, 8 pgs.
U.S. Appl. No. 12/652,725, Supplemental Notice of Allowance mailed Dec. 12, 2012, 2 pgs.
U.S. Appl. No. 13/768,072, Non Final Office Action mailed May 20, 2013, 7 pgs.
U.S. Appl. No. 13/768,072, Notice of Allowance mailed Sep. 2, 2013, 6 pgs.
U.S. Appl. No. 13/768,072, Response filed Aug. 16, 2013 to Non Final Office Action mailed May 20, 2013, 12 pgs.
Bilbrey, B., "Live Video Object Manipulation Now: A Revolution in the Making", Advanced Imaging, (Jul. 1994), 2 pgs.
U.S. Appl. No. 17/104,305, filed Nov. 25, 2020, Brett C. Bilbrey et al.
U.S. Appl. No. 19/030,226, filed Jan. 17, 2025, Brett C. Bilbrey, et al.

* cited by examiner

SYNCHRONIZED, INTERACTIVE AUGMENTED REALITY DISPLAYS FOR MULTIFUNCTION DEVICES

This application is a continuation of U.S. patent application Ser. No. 17/104,305, filed Nov. 25, 2020, which is a continuation of U.S. patent application Ser. No. 16/240,655, filed Jan. 4, 2019, now U.S. Pat. No. 10,854,008, which is a continuation of U.S. patent application Ser. No. 15/081,145, filed on Mar. 25, 2016, now U.S. Pat. No. 10,176,637, which is a continuation of U.S. patent application Ser. No. 14/146,419, filed Jan. 2, 2014, now U.S. Pat. No. 9,305,402, which is a continuation of U.S. patent application Ser. No. 13/768,072, filed on Feb. 15, 2013, now U.S. Pat. No. 8,625,018, which is a continuation of U.S. Ser. No. 12/652,725, filed Jan. 5, 2010, and now U.S. Pat. No. 8,400,548, which are hereby incorporated by reference herein in their entirety.

TECHNICAL FIELD

This is related generally to augmented reality applications on multifunction devices.

BACKGROUND

Augmented Reality (AR) technology combines a live view of a real-world, physical environment with computer-generated imagery. Information about the real world environment can be stored and retrieved as an information layer which can be overlaid on the live view and interacted with by a user. Despite strong academic and commercial interest in AR systems, many existing AR systems are complex and expensive making such systems unsuitable for general use by the average consumer.

SUMMARY

A device can receive images and/or live video of a real-world, physical environment on a touch sensitive surface One or more objects can be identified in the live video One or more information layers can be generated related to the objects. In some implementations, an information layer can include annotations made by a user through the touch sensitive surface. The information layer and live video can be combined in a display of the device. Data can be received from one or more onboard sensors indicating that the device is in motion. The sensor data can be used to synchronize the live video and the information layer as the perspective of video camera view changes due to the motion. The live video and information layer can be shared with other devices over a communication link.

In one embodiment, a device can provide a split screen display that can include a first display area for displaying the live video combined with the information layer and a second display area for displaying computer-generated imagery representing objects in the live video. The computer-generated imagery can be combined with the information layer in the second display area. A navigation control for allowing the user to navigate the computer-generated imagery can be provided with the split screen display. Alternatively, the user can navigate the computer-generated imagery by physically moving the device.

DETAILED DESCRIPTION

AR Display Overview

Figure 1A:
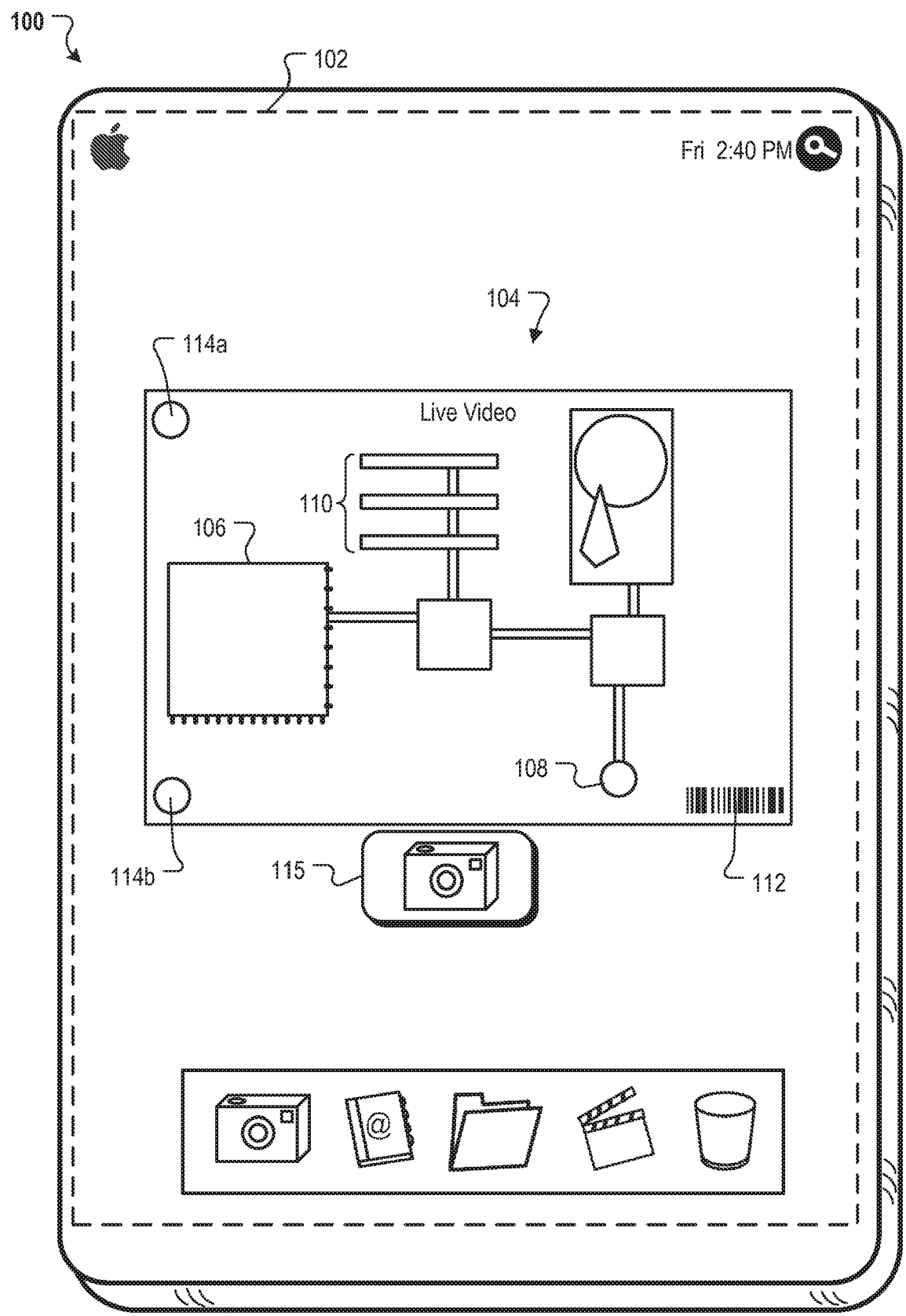
FIG. 1A illustrates an exemplary device for receiving live video of a real-world, physical environment.

FIG. 1A illustrates example device 100 for receiving live video of a real-world, physical environment. Device 100 can be any device capable of supporting AR displays, including but not limited to personal computers, mobile phones, electronic tablets, game consoles, media players, etc. In some implementations, device 100 can be an electronic tablet having a touch sensitive surface 102. In one embodiment, device 100 can include a video camera on a back surface (not shown). Other device configurations are possible including devices having video cameras on one or more surfaces.

In the example shown, the user is holding device 100 over a circuit board. A live video 104 of the circuit board is shown on surface 102. Various objects are shown in live video 104. For example, the circuit board shown includes processor chip 106, capacitor 108, memory cards 110 and other components. The circuit board also includes bar code 112 and markers 114a, 114b. Virtual button 115 can be used to capture one or more frames of live video.

Example Information Layer

Figure 1B:
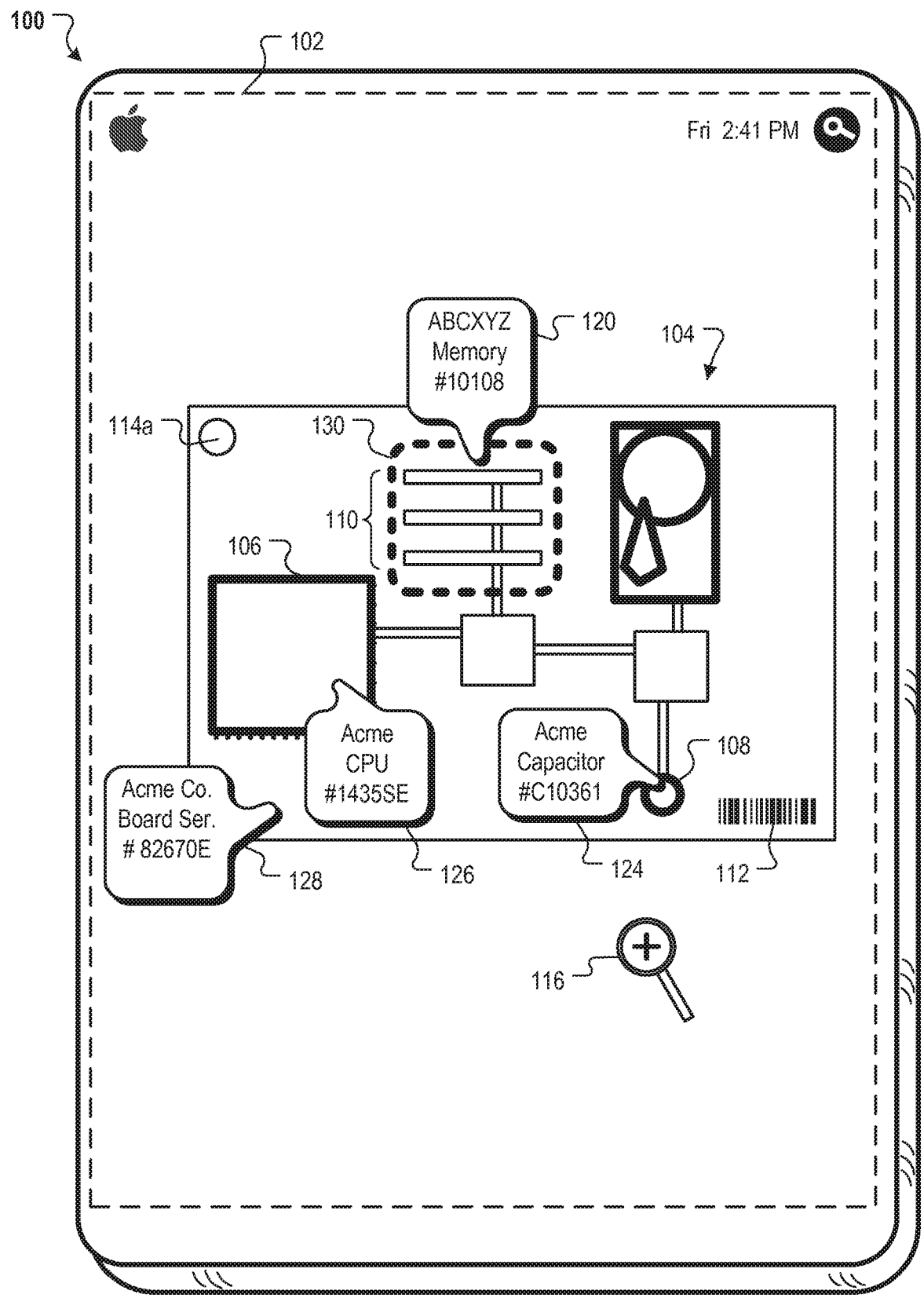
FIG. 1B illustrates the exemplary device of FIG. 1A displaying the live video combined with an information layer.

FIG. 1B illustrates example device 100 of FIG. 1A displaying live video 104 combined with an information layer. Components 106, 110 and 108 can be been outlined (e.g., with dashed or colored lines), highlighted or otherwise annotated by the information layer (hereafter referred to collectively as "annotations"). For example, memory cards 110 are shown outlined with dashed line 130 and processor 106 and capacitor 108 are shown with thick outlines. Generally, any visual attribute that can set off an object from other objects in live video 104 can be an annotation.

Annotations can include text, images or references to other information (e.g., links). The annotations can be displayed proximate to their corresponding objects in live video 104. Annotations can describe or otherwise provide useful information about the objects to a user (e.g., a computer technician). In the example shown, balloon call out 120 identifies memory cards 110, balloon callout 122 identifies capacitor 108, balloon callout 126 identifies processor 106 and balloon call out 128 identifies the circuit board. Additional related information, such as the manufacturer and part number can be included in the balloon callouts. Information layer can display annotations automatically or in response to trigger events. For example, the balloon call outs may only appear in live video 104 when the user is touching the corresponding annotated component.

Before an information layer can be generated, the objects to be annotated can be identified. The identification of objects in live video 104 can occur manually or automatically. If automatically, a frame of live video 104 can be "snapped" (e.g., by pressing button 115) and processed using known object recognition techniques, including hut not limited to: edge detection, Scale-invariant Feature Transform (SIFT), template matching, gradient histograms, intra-class transfer learning, explicit and implicit 3D object models, global scene representations, shading, reflectance, texture, grammars, topic models, window-based detection, 3D cues, context, leveraging Internet data, unsupervised learning and fast indexing. The object recognition can be performed on device 100 or by a network resource (e.g., AR service 570 of FIG. 5).

To assist in identification, barcode 112 can be identified by an image processor and used to retrieve a predefined information layer. To assist in overlaying the information layer onto live video 104, and to align the annotations to the correct components, the image processor can identify marker 114a as indicating the top left corner of the circuit board. One or more markers can be used for an object. A location of a given annotation (e.g., dashed line 130) in live video 104 can be a fixed distance and orientation with respect to marker 114a.

The information layer can include a variety of information from a variety of local or network information sources. Some examples of information include without limitation specifications, directions, recipes, data sheets, images, video clips, audio files, schemas, user interface elements, thumbnails, text, references or links, telephone numbers, blog or journal entries, notes, part numbers, dictionary definitions, catalog data, serial numbers, order forms, marketing or advertising and any other information that may be useful to a user. Some examples of information resources include without limitation: local databases or cache memory, network databases, Websites, online technical libraries, other devices, or any other information resource that can be accessed by device 100 either locally or remotely through a communication link. In the example shown, balloon call out 124 includes a manufacturer ("Acme"), name of component 108 ("Capacitor") and part number ("#C10361").

Magnifying glass tool 116 can be manipulated by a user to magnify or zoom an object in live video 104. For example, if the user wanted to see a detail of processor 106, the user could move the magnifying glass tool 116 over processor 106 and live video 104 would zoom on processor 106 resulting in more detail. The view of the magnifying glass tool 116 can be sized using, for example, pinch gestures.

Figure 1C:
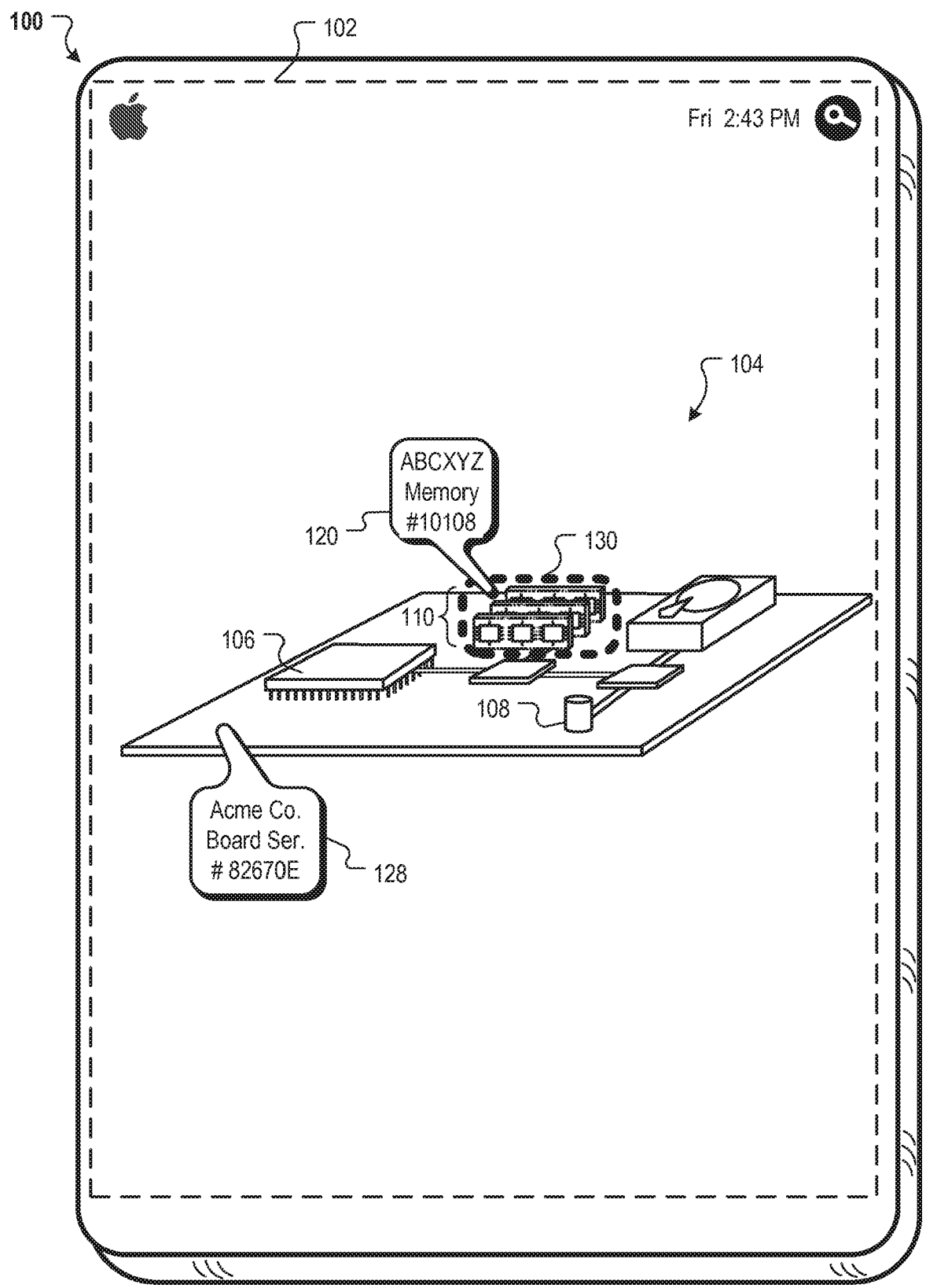
FIG. 1C illustrates the exemplary device of FIG. 1B displaying a three-dimensional (3D) perspective view of the live video combined with the information layer.

FIG. 1C illustrates the example device of FIG. 1B displaying a three-dimensional (3D) perspective view of the live video combined with the information layer. In this example, the user is pointing the video camera of device 100 at a different location to obtain a 3D perspective view of the circuit board. The information layer can be overlaid on the perspective view and aligned without having to re-perform object recognition using data output from onboard motion sensors. For example, outputs from onboard gyros, magnetometers or other motion sensors can be used to determine current video camera view angles relative to a reference coordinate frame and then use the view angles to redraw the information layer over the perspective view such that annotations remain properly aligned with their respective objects. In the example shown, annotation 130 (the dashed line) has been relocated to surround memory cards 110 without re-performing manual or automatic object recognition. Using onboard sensors is advantageous in that a user can maneuver device around a collection of objects and have annotations appear without incurring delays associated with object recognition processing. Object recognition can be performed once on a collection of objects and the sensor data can be use to update annotations for the objects.

In some implementations, current video camera view angles can be used to index a look-up table of information layer data (e.g., annotations) for generating overlays that align correctly with objects in the live video. The video camera view angles can be represented by yaw, pitch and roll angles in a reference coordinate frame. For example, if we assume the yaw, pitch and roll angles are all zero when the video camera is pointing directly over the circuit board as shown in FIG. 1A, then the angle set (0,0,0) can be associated with the particular annotations shown in FIG. 1A. If the user pitches the video camera up by +90 degrees, then the angle set (0, 90, 0) can be associated with the annotations shown in FIG. 1C. The look up table can be stored on the device or provided by a network resource.

Figure 1D:
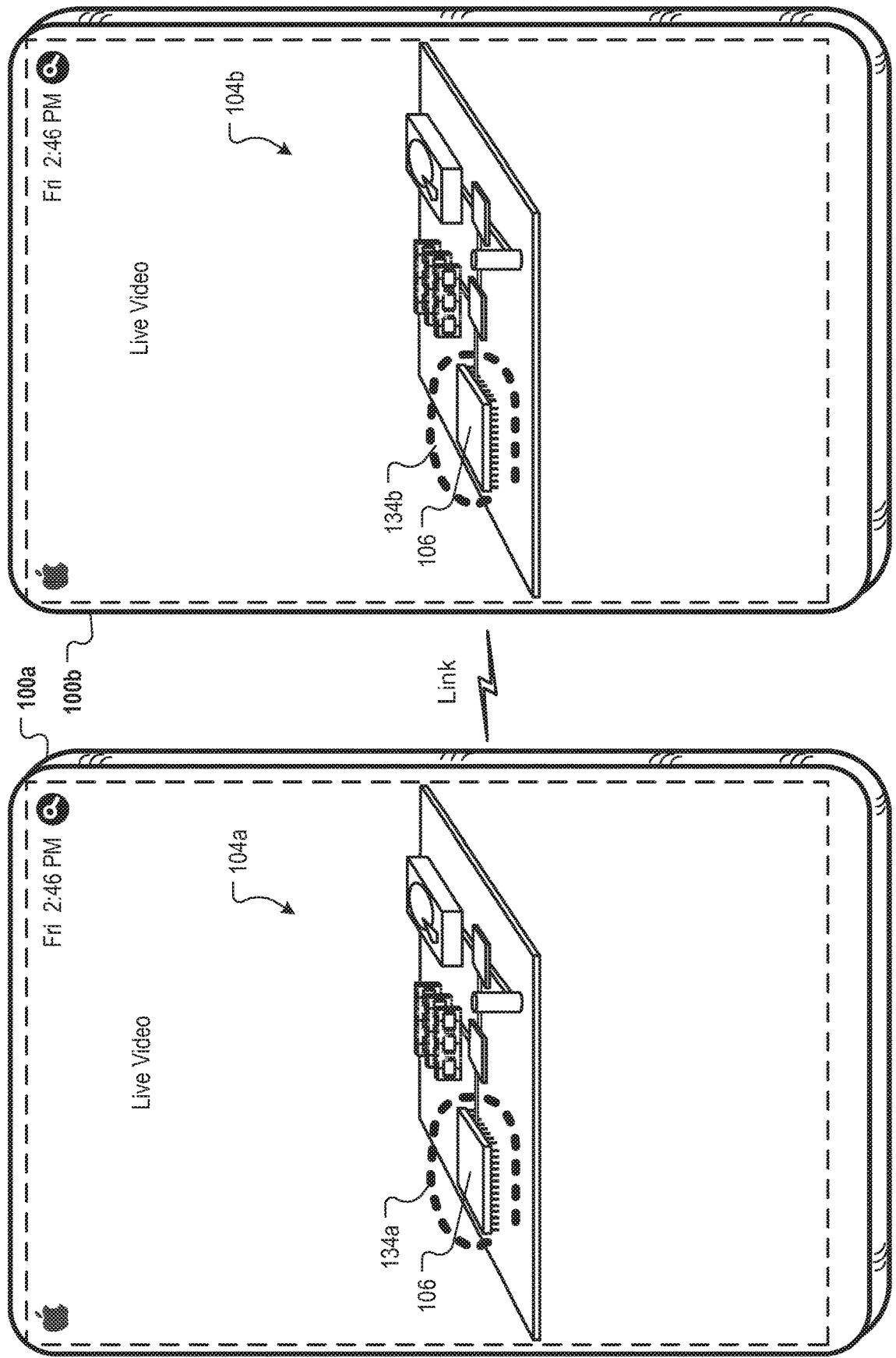
FIG. 1D illustrates an exemplary method of synchronizing live video displays on first and second devices and sharing changes to the information layer.

FIG. 1D illustrates synchronizing live video displays on first and second devices and sharing changes to the information layer. In the example shown, first device 100a is displaying live video 104a, which is capturing a perspective view of the circuit board. Live video 104a can be fed to second device 100b through a communication link (e.g., unidirectional or bidirectional) so that second device 100b displays live video 104b of the circuit board. The information layer generated for live video 104a on device 100a can also shared with device 100b by sending the information layer data with the live video feed over the communication link. The communication link can be wired or wireless (e.g., Bluetooth, WiFi).

In some implementations, the sensor output data (e.g., video camera view angles) can be communicated to device 100b over the communication link so that the current orientation of the video camera on device 100a relative to the object is known to device 100b. This sensor data can be used by device 100b to regenerate the information overlay on device 100b without sending device 100b the actual information layer data.

In some implementations, the user of either device 100a or device 100b can use touch input or gestures to generate new annotations (e.g., a draw a circle around a component) and those annotations can be shared with the other device through the communication link. In some implementations, a gesture itself can indicate desired information. For example, drawing a circle around processor 106 in live video 104 can indicate that the user wants more information about processor 106. As a user draws annotations on live video 104a those annotations can be reflected to live video 104b. This feature allows users of devices 100a, 100b to interact and collaborate through the information layer. In some implementations, if devices 100a, 100b have telephony capability the users can speak to each other while observing live video 104a, 104b and the information layer.

Other Example Applications

In one example application, device 100 can capture images or live video of a document and the text of the document can be recognized in the images or the live video. An information layer (e.g., an answer sheet) can be generated and combined with the live video. For example, a teacher can hold device 100 over a student's exam paper and an outline showing incorrect answers to exam questions can be displayed in the live video to assist the teach in grading the exam paper.

In another example, device 100 can capture a live video of an engine of a car or other vehicle and the parts of the engine can be recognized from the live video. An information layer (e.g., a manual excerpt) can be generated and combined with the live video. For example, a car mechanic can hold device 100 over a car engine and an outline identifying parts and providing excerpts from a repair manual or schematics can be displayed in the live video to assist the mechanic in repairing the engine.

Device 100 can be used in a variety of medical applications. In some implementations, a doctor can use device 100 to capture a live video of the patient's face. Using pattern recognition and/or other information (e.g., a bar code or other patient identifier), information related to the patient (e.g., medical history, drug prescriptions) can be displayed on device 100. In other implementations, a live video of a body part that needs medical attention can be captured and augmented with annotations that can help the doctor make a diagnosis. The video can be shared with other doctors who can generate annotations on their respective devices to assist the doctor in a diagnosis. Pattern matching or other image processing can be used to identify problems with the injured body part based on its visual appearance (e.g., color). In one example application, an x-ray or MRI video can be displayed with the live video.

Example Split Screen Display with Computer—Generated Imagery

Figure 2A:
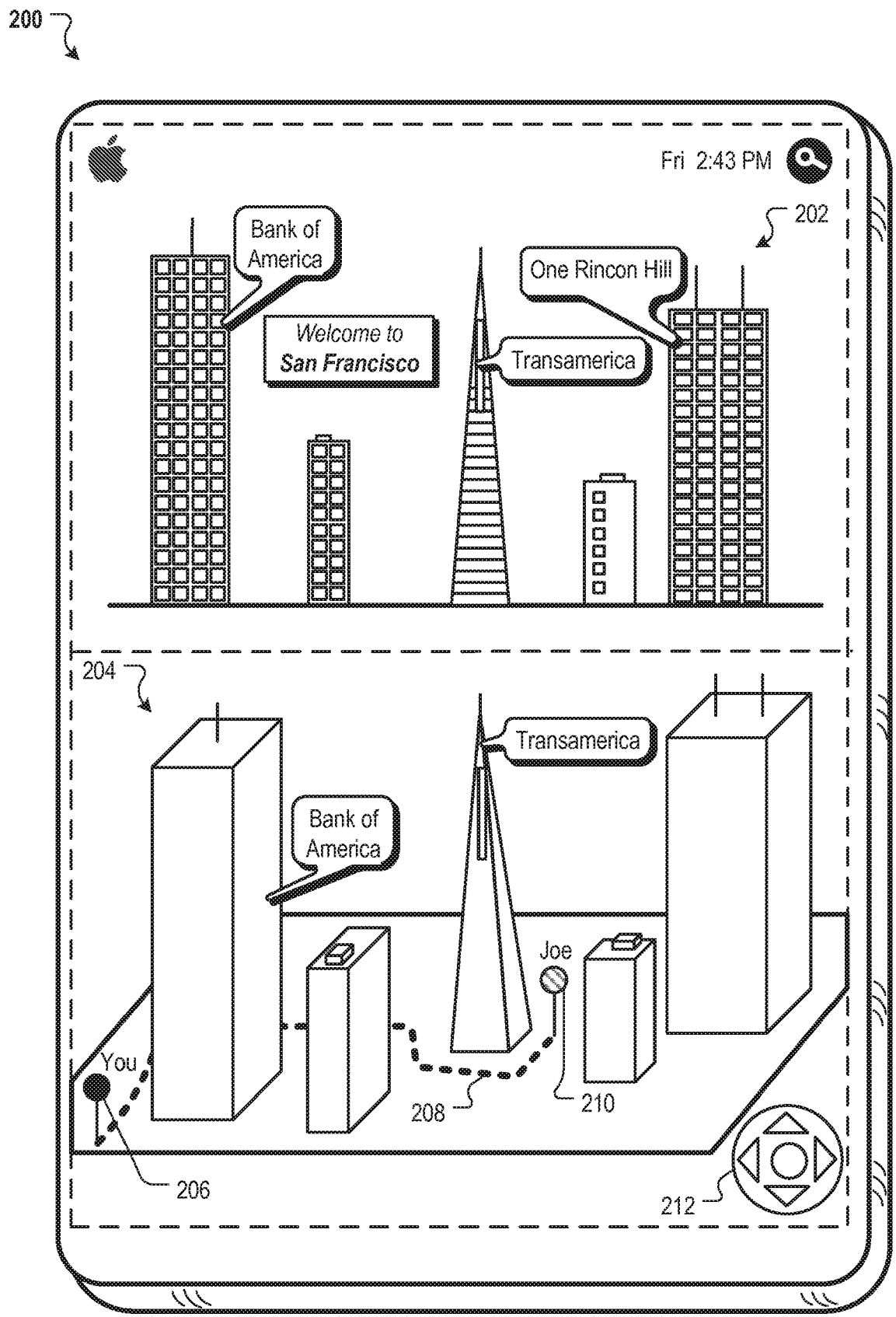
FIG. 2A illustrates an exemplary device having a split screen display with computer-generated imagery.

FIG. 2A illustrates example device 200 having a split screen display with computer-generated imagery. In some implementations, a split screen display can be used to display an object or other subject matter on one side of the split, and computer-generated imagery (e.g., in either two or three dimensions) on the other side of the split In the example shown, a user is viewing a live video of the skyline of downtown San Francisco in first display area 202. Object recognition has been performed on a captured frame of video and an information layer has been generated. Specifically, balloon call outs have been displayed proximate to their respective buildings or structures in the live video. The user can interact with the information layer as described in reference to FIGS. 1A-1D.

In some implementations, the live video scene can be determined and object recognition assisted by using an onboard positioning system (e.g., GPS, WiFi, Cell ID). For example, a frame of captured video of downtown San Francisco can be transmitted to a network resource, together with the current geographic coordinates of device 200 received from the onboard positioning system. Additionally, motion sensor data (e.g., angle data) can be sent to the network service that defines the current view of the onboard video camera capturing the live video. The motion sensor can be used to select a subset of pre-computed computer-generated imagery of downtown San Francisco that is relevant to the current view of the onboard video camera.

Second display area 204 of the split screen display can show computer-generated imagery of the objects (e.g., buildings) in the images (e.g., live video) of display area 202. In some implementations, the computer-generated imagery can be created on the fly or can be retrieved from a repository. For example, once the live video has been identified as downtown San Francisco, computer-generated imagery of downtown San Francisco can be downloaded from a network resource. Alternatively, known real-time rendering techniques can be used to generate 3D computer-generated imagery that can be navigated by the user. For example, 3D models of recognized objects of downtown San Francisco can be constructed out of geometrical vertices, faces, and edges in a 3D coordinate system. The models can be rendered using known real-time rendering techniques (e.g., orthographic or perspective projection, clipping, screen mapping, rasterizing) and transformed into the current view space of the live video camera. Transforming models into the current view space can be accomplished using sensor output from onboard sensors. For example, gyroscopes, magnetometers and other motion sensors can provide angular displacements angular rates and magnetic readings with respect to a reference coordinate frame, and that data can be used by a real-time onboard rendering engine to generate 3D imagery of downtown San Francisco. If the user physically moves device 200, resulting in a change of the video camera view, the information layer and computer-generated imagery can be updated accordingly using the sensor data. In some implementations, the user can manipulate navigation control 212 to navigate the 3D imagery (e.g., tilting, zooming, panning, moving).

In some implementations, the current location of device 200 can be used to compute a route for display in the 3D computer-generated imagery. In the example shown, marker 206 (e.g., a pushpin) can be used to identify the current location of device 200 (in this example indicated as "You"), and second marker 210 can be used to identify a destination or another device (in this example indicated by "Joe"). A route can then be computed and overlaid on the 3D computer-generated imagery as shown in FIG. 2A. Touching markers 206, 210 can invoke various applications on device 200, such as a communication application (e.g., text messaging, chat session, email, telephony) for allowing communication between device 200a and device 200h.

Example Synchronization of Split Screen Displays

Figure 2B:
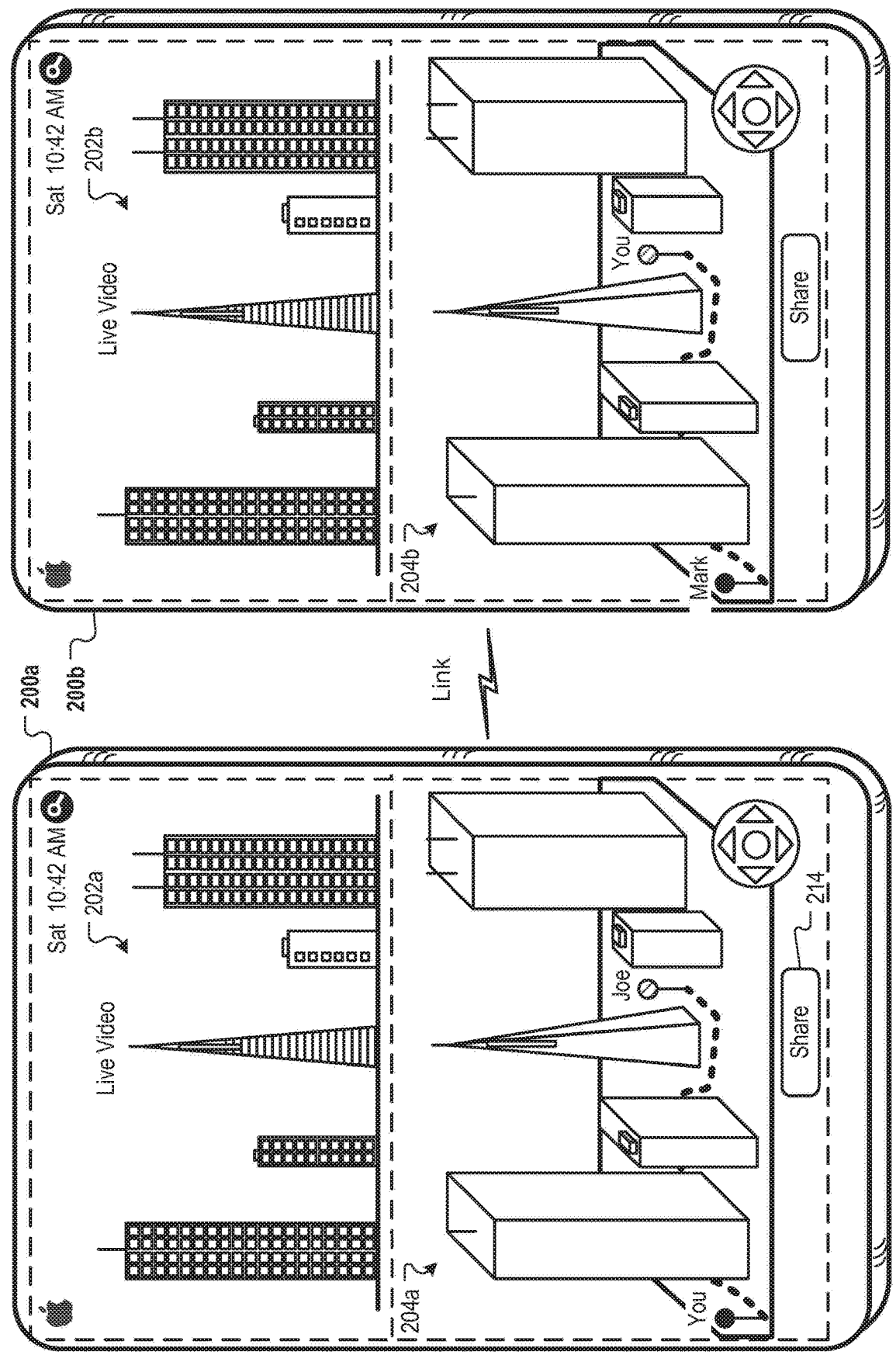
FIG. 2B illustrates synchronizing split screen displays of exemplary first and second devices.

FIG. 2B illustrates synchronizing split screen displays of first and second devices 200a, 200b. In the example shown, device 200a has established communication with device 200b. The image (e.g., live video) scene of downtown San Francisco captured by the video camera on device 200a can be displayed in display area 202b of device 200b. Also, computer-generated imagery shown in display area 204a can be shown in display area 204b of device 200b. Note that in display area 204b, the location of device 200b is indicated by "You" and the destination or device 200a is indicated by the marker "Mark," i.e., the user of device 200a. The communication link can be a direct communication link or an indirect communication link using wireless network access points (e.g., WiFi access points). The communication link can also include a wide area network, such as the Internet.

When a user moves device 200a, resulting in a change in the video camera view, motion sensor data can be used to update the computer-generated imagery in display areas 204a, 204h, thus maintaining synchronization between display areas 202a, 204a and display areas 202b, 204b. In some implementations, share button 214 can be used to initiate sharing of live video, the information layer and computer-generated imagery with another device.

Example Process for Synchronizing Displays

Figure 3:
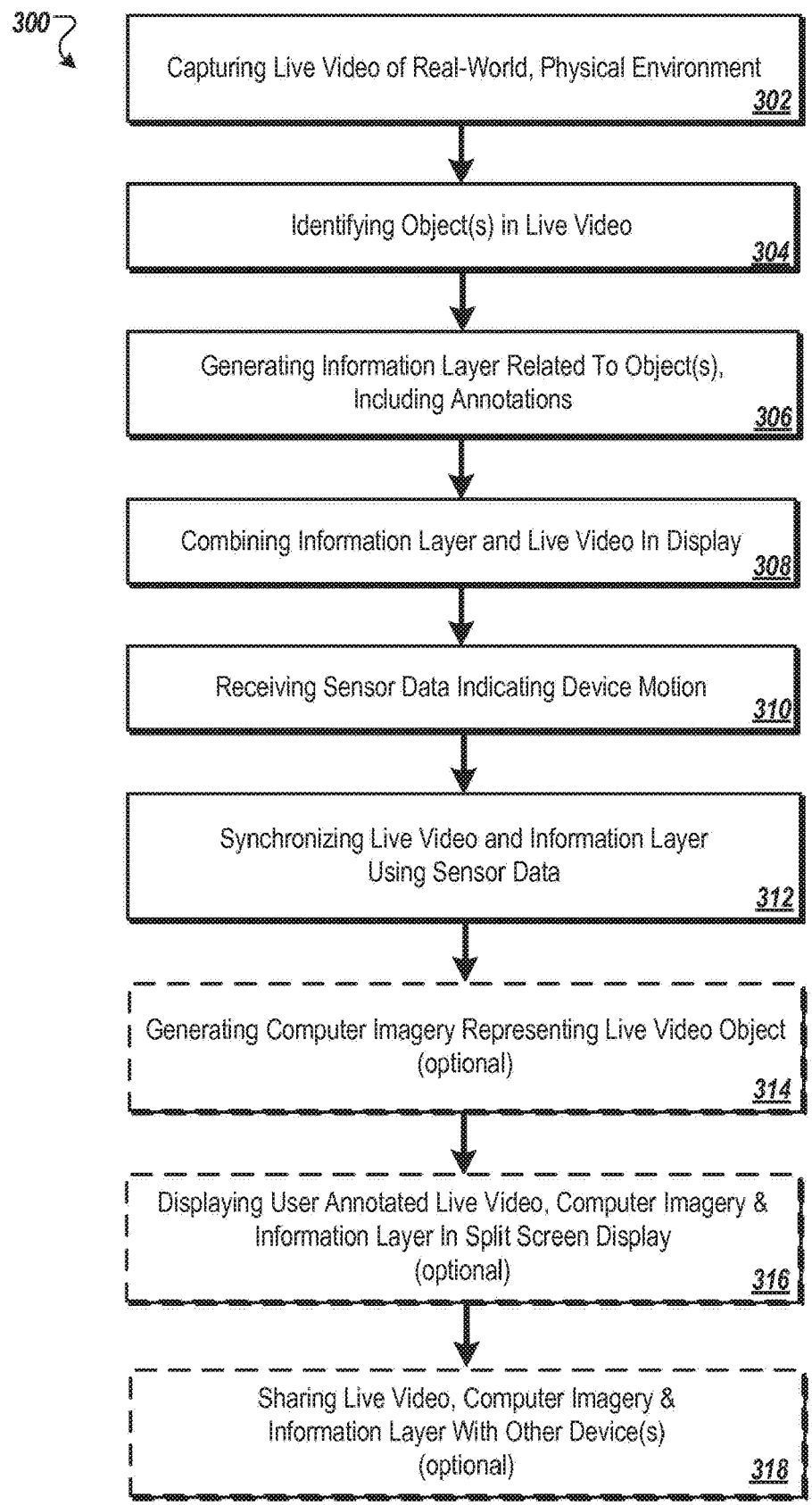
FIG. 3 is a flow diagram of an exemplary process for synchronizing interactive AR displays.

FIG. 3 is a flow diagram of an example process 300 for synchronizing, interactive AR displays. Process 300 can be described in reference to devices 100, 200.

In some implementations, process 300 can begin on a device (e.g., device 100 or 200) by capturing live video of a real-world, physical environment (302). One or more objects in the live video can be identified (304). The objects can be identified manually (e.g., by user selection using touch input) or automatically using known object recognition techniques. An information layer related to the one or more objects is generated and can include one or more annotations (306). The information layer and live video are combined in a display (308). Sensor data generated by one or more onboard sensors is received (310). The data can be angle data from a gyro, for example. The live video and information layer are synchronized using the sensor data (312). Optionally, computer imagery can be generated representing objects in the live video (314). The computer imagery can be pre-computed and retrieved from a repository or generated on the fly using known real-time rendering techniques. Optionally, the annotated live video, computer-generated imagery and information layer can be displayed in a split screen display (316), as described in reference to FIG. 2A. Optionally, the annotated live video, computer-generated imagery and information layer can be shared (318) with one or more other devices, and the AR displays of the devices can be synchronized to account for changes in video views.

Example Device Architecture

Figure 4:
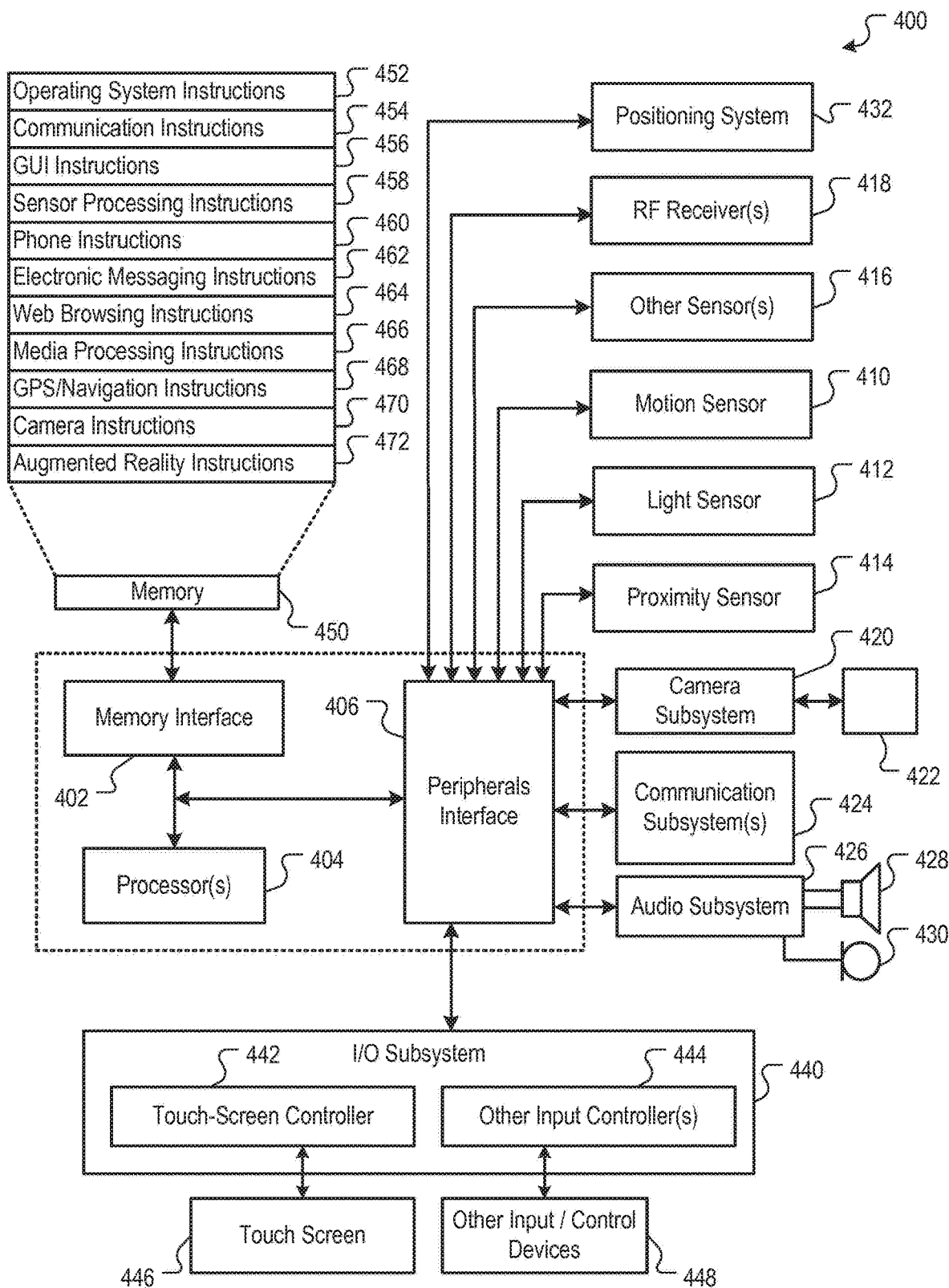
FIG. 4 is a block diagram of exemplary device architecture for implementing synchronized, interactive AR displays.

FIG. 4 is a block diagram of an example architecture for a device 400 implementing synchronized, interactive AR displays. Device 400 can include memory interface 402, one or more data processors, image processors and/or central processing units 404, and peripherals interface 406. Memory interface 402, one or more processors 404 and/or peripherals interface 406 can be separate components or can be integrated in one or more integrated circuits. The various components in device 400 can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate various orientation, lighting, and proximity functions. For example, in some implementations, light sensor 412 can be utilized to facilitate adjusting the brightness of touch screen 446. In some implementations, motion sensor 411 can be utilized to detect movement of the device. Accordingly, display objects and/or media can be presented according to a detected orientation, e.g., portrait or landscape.

Other sensors 416 can also be connected to peripherals interface 406, such as a temperature sensor, a biometric sensor, a gyroscope, magnetometer or other sensing device, to facilitate related functionalities.

For example, positioning information can be received by device 400 from positioning system 432. Positioning system 432, in various implementations, can be a component internal to device 400, or can be an external component coupled to device 400 (e.g., using a wired connection or a wireless connection). In some implementations, positioning system 432 can include a GPS receiver and a positioning engine operable to derive positioning information from received GPS satellite signals. In other implementations, positioning system 432 can include a compass (e.g., a magnetic compass) and an accelerometer, as well as a positioning engine operable to derive positioning information based on dead reckoning techniques. In still further implementations, positioning system 432 can use wireless signals (e.g., cellular signals, IEEE 802.11 signals) to determine location information associated with the device Hybrid positioning systems using a combination of satellite and television signals.

Broadcast reception functions can be facilitated through one or more radio frequency (RF) receiver(s) 418. An RF receiver can receive, for example, AM/FM broadcasts or satellite broadcasts (e.g., XM® or Sirius® radio broadcast). An RF receiver can also be a TV tuner. In some implementations, RF receiver 418 is built into wireless communication subsystems 424. In other implementations, RF receiver 418 is an independent subsystem coupled to device 400 (e.g., using a wired connection or a wireless connection). RF receiver 418 can receive simulcasts. In some implementations, RF receiver 418 can include a Radio Data System (RDS) processor, which can process broadcast content and simulcast data (e.g., RDS data). In some implementations, RF receiver 418 can be digitally tuned to receive broadcasts at various frequencies. In addition, RF receiver 418 can include a scanning function which tunes up or down and pauses at a next frequency where broadcast content is available.

Camera subsystem 420 and optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 424. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 424 can depend on the communication network(s) or medium(s) over which device 400 is intended to operate. For example, device 400 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 424 may include hosting protocols such that Device 400 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 426 can be coupled to speaker 428 and one or more microphones 430. One or more microphones 430 can be used, for example, to facilitate voice-enabled functions, such as voice recognition, voice replication, digital recording, and telephony functions.

I/O subsystem 440 can include touch screen controller 442 and/or other input controller(s) 444. Touch-screen controller 442 can be coupled to touch screen 446. Touch screen 446 and touch screen controller 442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 446 or proximity to touch screen 446.

Other input controller(s) 444 can be coupled to other input/control devices 448, such as one or more buttons, rocker switches, thumb-wheel, infrared port, USB port, or a pointer device such as a stylus. The one or more buttons (not shown) can include an up/down button for volume control of speaker 428 and/or microphone 430.

In one implementation, a pressing of the button for a first duration may disengage a lock of touch screen 446; and a pressing of the button for a second duration that is longer than the first duration may turn power to device 400 on or off The user may be able to customize a functionality of one or more of the buttons. Touch screen 446 can, for example, also be used to implement virtual or soft buttons and/or a keyboard.

In some implementations, device 400 can present recorded audio and/or video files, such as MP3, AAC, and MPEG files. In some implementations, device 400 can include the functionality of an MP3 player, such as an iPhone™.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can be a kernel (e.g., UNIX kernel).

Memory 450 may also store communication instructions 454 to facilitate communicating with one or more additional devices, one or more computers and/or one or more servers. Communication instructions 454 can also be used to select an operational mode or communication medium for use by the device, based on a geographic location (obtained by GPS/Navigation instructions 468) of the device. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes and instructions, e.g., mapping a target location; camera instructions 470 to facilitate camera-related processes and functions (e.g., live video); and augmented reality instructions 472 to facilitate the processes and features described in reference to FIGS. 1-3. Memory 450 may also store other software instructions (not shown), such as web video instructions to facilitate web video-related processes and functions; and/or web shopping instructions to facilitate web shopping-related processes and functions. In some implementations, media processing instructions 466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software applications, procedures, or modules. Memory 450 can include additional instructions or fewer instructions. Furthermore, various functions of device 400 may be implemented in hardware and/or in software, including in one or more signal processing and/or application specific integrated circuits.

Example Network Operating Environment

Figure 5:
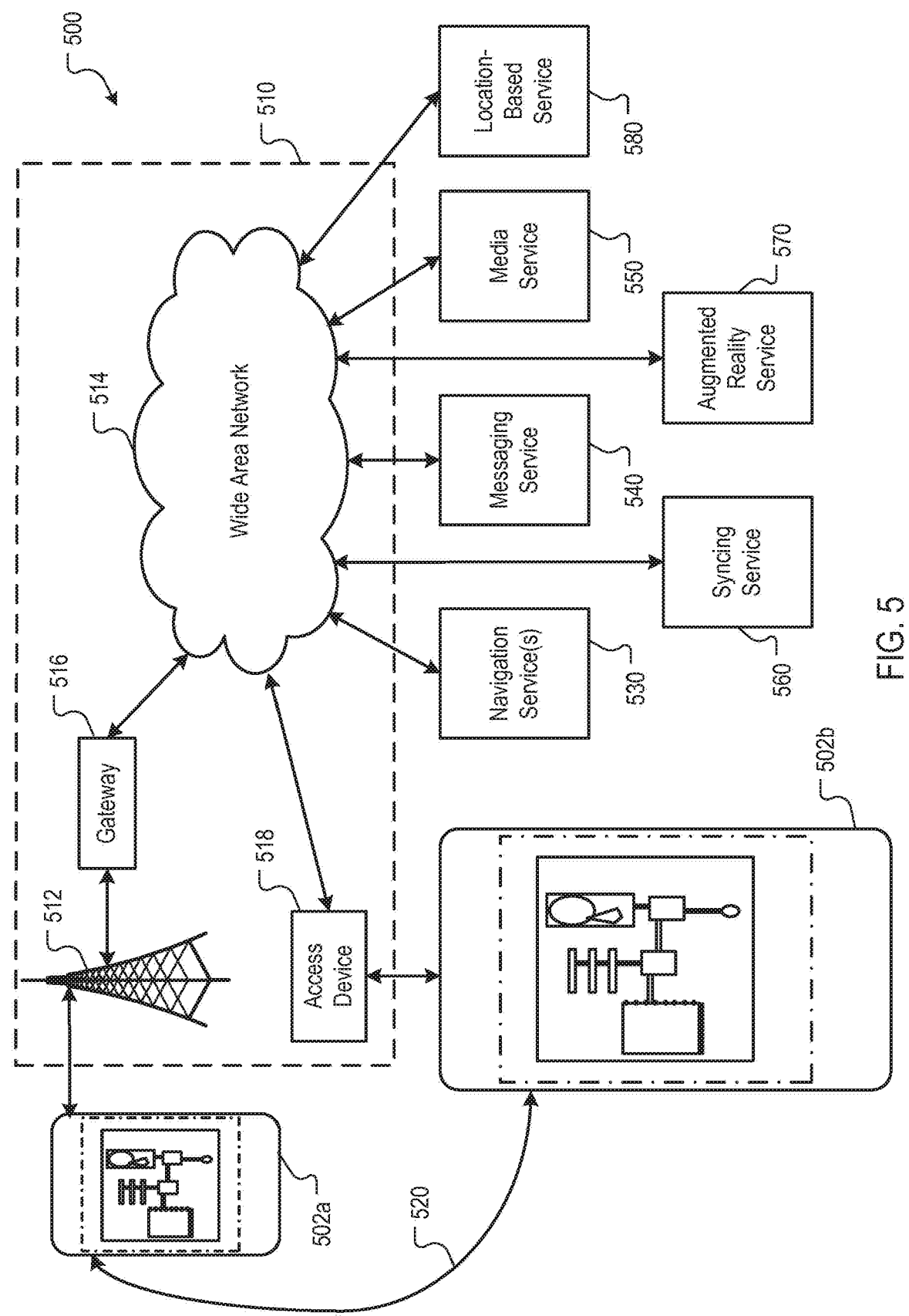
FIG. 5 is a block diagram of an exemplary network operating environment for devices implementing synchronized, interactive AR displays.

FIG. 5 is a block diagram of an example network operating environment for devices implementing synchronized, interactive augmented reality displays. Devices 502a and 502b can, for example, communicate over one or more wired and/or wireless networks 510 in data communication. For example, wireless network 512, e.g., a cellular network, can communicate with a wide area network (WAN) 514, such as the Internet, by use of gateway 516. Likewise, access device 518, such as an 802.11g wireless access device, can provide communication access to wide area network 514. In some implementations, both voice and data communications can be established over wireless network 512 and access device 518. For example, device 502a can place and receive phone calls (e.g., using VoIP protocols), send and receive e-mail messages (e.g., using POP3 protocol), and retrieve electronic documents or streams, such as Web pages, photographs, and videos, over wireless network 512, gateway 516, and wide area network 514 (e.g., using TCP/IP or UDP protocols). Likewise, in some implementations, device 502b can place and receive phone calls, send and receive e-mail messages, and retrieve electronic documents over access device 121 8 and wide area network 514. In some implementations, devices 502a or 502b can be physically connected to access device 518 using one or more cables and access device 518 can be a personal computer. In this configuration, device 502a or 502b can be referred to as a "tethered" device.

Devices 502a and 502b can also establish communications by other means. For example, wireless device 502a can communicate with other wireless devices, e.g., other devices 502a or 502b, cell phones, etc., over wireless network 512. Likewise, devices 502a and 502b can establish peer-to-peer communications 520, e.g., a personal area network, by use of one or more communication subsystems, such as a Bluetooth™ communication device. Other communication protocols and topologies can also be implemented.

Devices 502a or 502b can, for example, communicate with one or more services over one or more wired and/or wireless networks 510. These services can include, for example, navigation services 530, messaging services 540, media services 550, location based services 580, syncing services 560 and AR services 570. Syncing services 560 can support over network syncing of AR displays on two or more devices. AR services 570 can provide services to support the AR features and processes described in reference to FIGS. 1-3.

Device 502*a* or 502*b* can also access other data and content over one or more wired and/or wireless networks 510. For example, content publishers, such as news sites, RSS feeds, web sites, blogs, social networking sites, developer networks, etc., can be accessed by Device 502*a* or 502*b*. Such access can be provided by invocation of a web browsing function or application (e.g., a browser) in response to a user touching, for example, a Web object.

The features described can be implemented in digital electronic circuitry, or m computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information fro transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system, comprising:
   a camera;
   one or more processors; and
   a memory storing instructions that, when executed by the one or more processors, cause the one or more processors to:
   capture, via the camera, live video of a document, wherein the live video is displayed on a display;
   recognize a text element in the document;
   overlay an outline around the text element in the live video;

determine, using the captured live video of the document, information layer data for generating overlays around the text element in the live video;
store the determined information layer data;
synchronize, using the stored information layer data, the outline with the text element in the live video;
send the live video and data indicating the outline over a network to another device;
receive, from the other device and over the network, data indicating another outline for another text element recognized in the document; and
overlay the other outline around the other text element, wherein the other outline is synchronized with the other text element in the live video.

2. The system of claim 1, wherein:
the system comprises one or more microphones and speakers; and
the system is configured to:
send audio data captured by the one or more microphones as part of the live video to the other device; and
play audio data received from the other device via the one or more speakers.

3. The system of claim 2, wherein:
the system comprises a cell phone; and
the live video is sent to the other device via a phone call with the other device.

4. The system of claim 1, wherein the instructions when executed by the one or more processors cause the one or more processors to associate an annotation with the outline in the live video.

5. The system of claim 4, wherein:
the system comprises a touch sensitive surface; and
the annotation is generated in response to user input received via the touch sensitive surface.

6. The system of claim 5, wherein:
the annotation includes textual content; and
the textual content is retrieved from a remote information source over the network.

7. The system of claim 1, wherein:
the document includes questions and answers; and
the outline is displayed around a particular answer in the document.

8. The system of claim 1, wherein:
the outline and the other outline are part of an information layer that is shared between the system and the other device.

9. The system of claim 1, wherein:
the system is configured to establish a wireless communication link with the other device, wherein the wireless communication link is a Wifi or Bluetooth connection.

10. A method, comprising:
performing by a computing device:
capturing, via a camera, live video of a document, wherein the live video is displayed on a display;
recognizing a text element in the document;
overlaying an outline around the text element in the live video;
determining, using the captured live video of the document, information layer data for generating overlays around the text element in the live video;
storing the determined information layer data;
synchronizing, using the stored information layer data, the outline with the text element in the live video;
sending the live video and data indicating the outline over a network to another device;
receiving, from the other device and over the network, data indicating another outline for another text element recognized in the document; and
overlaying the other outline around the other text element, wherein the other outline is synchronized with the other text element in the live video.

11. The method of claim 10, further comprising:
sending audio data captured by one or more microphones as part of the live video to the other device; and
playing audio data received from the other device via the one or more speakers.

12. The method of claim 11, wherein:
the live video is sent to the other device via a phone call with the other device.

13. The method of claim 10, further comprising associating an annotation with the outline in the live video.

14. The method of claim 13, wherein the annotation is generated in response to user input received via a touch sensitive surface.

15. The method of claim 13, wherein:
the annotation includes textual content; and
the textual content is retrieved from a remote information source over the network.

16. The method of claim 10, further comprising:
establishing a wireless communication link with the other device, wherein the wireless communication link is a Wifi or Bluetooth connection.

17. The method of claim 10, wherein:
the outline and the other outline are part of an information layer that is shared between the computing device and the other device.

18. One or more non-transitory, computer-readable storage media storing instructions that, when executed on or across one or more processors, cause the one or more processors to:
capture, via the camera, live video of a document, wherein the live video is displayed on a display;
recognize a text element in the document;
overlay an outline around the text element in the live video;
determine, using the captured live video of the document, information layer data for generating overlays around the text element in the live video;
store the determined information layer data;
synchronize, using the stored information layer data, the outline with the text element in the live video;
send the live video and data indicating the outline over a network to another device;
receive, from the other device and over the network, data indicating another outline for another text element recognized in the document; and
overlay the other outline around the other text element, wherein the other outline is synchronized with the other text element in the live video.

19. The one or more non-transitory of claim 18, computer-readable storage media storing instructions that, when executed on or across one or more processors, cause the one or more processors to:
establish a phone call with the other device, wherein the live video is sent to the other device via the phone call.

20. The one or more non-transitory of claim 18, computer-readable storage media storing instructions that, when executed on or across one or more processors, cause the one or more processors to:

establish a Wifi or Bluetooth connection with the other device, wherein the live video is sent to the other device via the Wifi or Bluetooth connection.

\* \* \* \* \*